United States Patent
Valentin et al.

(10) Patent No.: US 12,450,859 B2
(45) Date of Patent: Oct. 21, 2025

(54) MODEL FITTING USING KEYPOINT REGRESSION

(71) Applicant: MICROSOFT TECHNOLOGY LICENSING, LLC, Redmond, WA (US)

(72) Inventors: Julien Pascal Christophe Valentin, Zurich (CH); Erroll William Wood, Cambridge (GB); Thomas Joseph Cashman, Cambridge (GB); Martin de La Gorce, Cambridge (GB); Tadas Baltrusaitis, Cambridge (GB); Daniel Stephen Wilde, Cambridge (GB); Jingjing Shen, Cambridge (GB); Matthew Alastair Johnson, Cambridge (GB); Charles Thomas Hewitt, Cambridge (GB); Nikola Milosavljevic, Belgrade (RS); Stephan Joachim Garbin, Cambridge (GB); Toby Sharp, Cambridge (GB); Ivan Stojiljkovic, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 42 days.

(21) Appl. No.: 17/852,175

(22) Filed: Jun. 28, 2022

(65) Prior Publication Data
US 2023/0281863 A1   Sep. 7, 2023

Related U.S. Application Data

(60) Provisional application No. 63/317,436, filed on Mar. 7, 2022.

(51) Int. Cl.
*G06V 10/25* (2022.01)
*G06N 3/08* (2023.01)
(Continued)

(52) U.S. Cl.
CPC ............ *G06V 10/25* (2022.01); *G06N 3/08* (2013.01); *G06T 7/344* (2017.01); *G06T 7/73* (2017.01);
(Continued)

(58) Field of Classification Search
CPC ........ G06V 10/25; G06V 10/82; G06T 7/344; G06T 7/73; G06T 17/00; G06T 19/20;
(Continued)

(56) References Cited

U.S. PATENT DOCUMENTS 10,019,622 B2 * 7/2018 Cao .................. G06V 10/754
10,902,628 B1 * 1/2021 Kharboutly ............. G06T 7/20
(Continued)

FOREIGN PATENT DOCUMENTS

EP   2154631 A2   2/2010
EP   3901817 A1   10/2021
(Continued)

OTHER PUBLICATIONS

Peter A.N. Bosman, Negative Log-Likelihood And Statistical Hypothesis Testing, Aug. 2000, Utrecht University, pp. 1-17.*
(Continued)

*Primary Examiner* — Abderrahim Merouan
(74) *Attorney, Agent, or Firm* — Han Gim; Newport IP, LLC

(57) ABSTRACT

Keypoints are predicted in an image. Predictions are generated for each of the keypoints of an image as a 2D random variable, normally distributed with location (x, y) and standard deviation sigma. A neural network is trained to maximize a log-likelihood that samples from each of the predicted keypoints equal a ground truth. The trained neural network is used to predict keypoints of an image without generating a heatmap.

20 Claims, 13 Drawing Sheets

(51) Int. Cl.
*G06T 7/33* (2017.01)
*G06T 7/73* (2017.01)
*G06T 17/00* (2006.01)
*G06T 19/20* (2011.01)
*G06V 10/82* (2022.01)

(52) U.S. Cl.
CPC .............. *G06T 17/00* (2013.01); *G06T 19/20* (2013.01); *G06V 10/82* (2022.01); *G06T 2207/20081* (2013.01); *G06T 2207/20084* (2013.01); *G06T 2207/30201* (2013.01); *G06T 2219/2004* (2013.01)

(58) Field of Classification Search
CPC . G06T 2207/20081; G06T 2207/20084; G06T 2207/30201; G06T 2219/2004; G06N 3/08

See application file for complete search history.

(56) References Cited

U.S. PATENT DOCUMENTS

| | | | |
|---|---|---|---|
| 10,972,719 | B1 | 4/2021 | Menzel |
| 2008/0310759 | A1* | 12/2008 | Liu ................... G06V 10/7557 382/294 |
| 2011/0299782 | A1* | 12/2011 | Hamsici ............. G06V 10/462 382/195 |
| 2019/0286885 | A1* | 9/2019 | Liu ..................... G06V 10/145 |
| 2020/0272806 | A1* | 8/2020 | Walker ............... G06V 40/167 |
| 2021/0056293 | A1* | 2/2021 | Yin .................... G06V 10/764 |
| 2021/0287336 | A1* | 9/2021 | Piadyk ................ G06V 20/52 |
| 2023/0281863 | A1* | 9/2023 | Valentin .............. G06V 10/774 345/419 |
| 2023/0281945 | A1* | 9/2023 | Cashman ........... G06V 20/653 382/181 |

FOREIGN PATENT DOCUMENTS

| | | |
|---|---|---|
| WO | 2016026135 A1 | 2/2016 |
| WO | 2020108785 A1 | 6/2020 |

OTHER PUBLICATIONS

Arnab, et al., "Exploiting Temporal Context for 3D Human Pose Estimation in the Wild", In Proceedings of the IEEE/CVF Conference on Computer Vision and Pattern Recognition, Jun. 15, 2019, pp. 3390-3399.

Bazargani, Hamid, "Real-Time Recognition of Planar Targets on Mobile Devices: A Framework for Fast and Robust Homography Estimation", In Thesis submitted to the Faculty of Graduate and Postdoctoral Studies in Electrical and Computer Engineering, Jan. 1, 2014, 106 Pages.

Deng, et al., "RetinaFace: Single-shot Multi-level Face Localisation in the Wild", In Proceedings of the IEEE/CVF Conference on Computer Vision and Pattern Recognition, Jun. 13, 2020, pp. 5202-5211.

"International Search Report and Written Opinion Issued in PCT Application No. PCT/US23/010526", Mailed Date: May 9, 2023, 11 Pages.

"International Search Report and Written Opinion Issued in PCT Application No. PCT/US23/012557", Mailed Date: Jun. 9, 2023, 10 Pages.

Prince, et al., "Tied Factor Analysis for Face Recognition across Large Pose Differences", In Journal of IEEE Transactions on Pattern Analysis and Machine Intelligence, vol. 30, Issue 6, Jun. 1, 2008, pp. 970-984.

Wood, et al., "3D Face Reconstruction with Dense Landmarks", In Proceedings of the 17th European Conference on Computer Vision, Nov. 3, 2022, pp. 160-177.

Aksan, et al., "LiP-Flow: Learning Inference-time Priors for Codec Avatars via Normalizing Flows in Latent Space", In Proceedings of the 17th European Conference on Computer Vision, Nov. 1, 2022, pp. 92-110.

"Gamma Distribution", Retrieved from: https://web.archive.org/web/20210207151333/https://en.wikipedia.org/wiki/Gamma_distribution, Feb. 7, 2021, 15 Pages.

U.S. Appl. No. 17/851,933, filed Jun. 28, 2022.

Bouachir, et al.,"Part-based Tracking via Salient Collaborating Features," IEEE, 2015, pp. 78-85.

Non-Final Office Action issued in U.S. Appl. No. 17/851,933, mailed on Aug. 19, 2024, 19 Pages.

Peng, et al.,"PVNet: Pixel-wise Voting Network for 6DoF Pose Estimation," CVF, Jun. 2019, pp. 4561-4570.

Zhang, et al.,"3D human pose estimation in motion based on multi-stage regression," Elsevier, Jun. 2021, pp. 1-7.

* cited by examiner

MODEL FITTING USING KEYPOINT REGRESSION

This application claims the benefit of and priority to U.S. Provisional Application No. 63/317,436, filed Mar. 7, 2022, the entire contents of which are incorporated herein by reference.

BACKGROUND

Landmark detection is a computer vision task where keypoints of an image, for example of a human body or face (e.g., characteristic points) or more generally any a priori object, are detected and localized in images and video. Keypoints can be used, for example, to detect a person's head position and rotation. Landmark detection can be challenging due to variability as well as a number of factors such as pose and occlusions. It is with respect to these considerations and others that the disclosure made herein is presented.

SUMMARY

Landmarks often play a key role in image analysis, but many aspects of identity or expression cannot be represented by a limited number of landmarks. In order to reconstruct, for example, faces more accurately, landmarks are often combined with additional signals such as depth images, or techniques such as differentiable rendering. The present disclosure provides a way to use more landmarks in an efficient and cost-effective manner. Besides faces, the present disclosure may be applied more generally to other types of images.

In an embodiment, synthetic training data may be used to guarantee perfect landmark annotations. By fitting a morphable model to these dense landmarks, state-of-the-art results for monocular 3D face reconstruction may be achieved with real-time responsiveness. Dense landmarks are an ideal signal for integrating face shape information across frames which can be demonstrated with accurate and expressive facial performance capture in both monocular and multi-view scenarios.

Keypoint confidence, or certainty, is useful when later algorithms consume the keypoints. For example, when fitting a 3D model to 2D keypoints, if a keypoint confidence is low, that keypoint may be considered to be unreliable and discounted during model fitting. This may occur if that keypoint is occluded, for example. Estimating uncertainty may also be useful to train better landmark estimators.

The present disclosure includes an algorithm for directly predicting keypoints (2D points of interest) in an image, with uncertainty. In this way a system, e.g., a neural network, can expose how confident it is about each keypoint. Referring to FIG. 1, given a single image 110, a large number of landmarks 120 are robustly and accurately predicted. To aid visualization, lines are drawn between landmarks. The disclosed 3D morphable face model is fit to these landmarks to reconstruct faces in 3D 130. Referring to FIG. 2, compared to a typical sparse set of (e.g., 68) facial landmarks 210, the disclosed dense landmarks 220 cover the entire head in greater detail, including ears, eyes, and teeth. These dense landmarks can provide improved encoding facial identity and subtle expressions.

The present disclosure enables direct regression for real time applications without the need, for example, of a heatmap. As used herein, a heatmap may be an image where the value stored at each pixel corresponds to the likelihood for the landmark to be at that pixel's location in the image. In an embodiment, the task may be reformulated from a 2D point estimation problem to a 2D random variable estimation problem. Each keypoint may be predicted as a 2D random variable, normally distributed with location (x, y) and standard deviation sigma. The network may be trained to maximize the log-likelihood that samples from each predicted keypoint equal the ground truth. Keypoint uncertainty arises during training since the network is penalized for being wrong about keypoint location, as well as being uncertain. The following provides a derivation (assuming uniform prior on sigma):

The ground truth consists of a set of keypoint coordinates $Y \in \mathbb{R}^{N \times 2}$:

$$Y = \begin{bmatrix} x_0 & y_0 \\ x_1 & y_1 \\ \vdots & \vdots \\ x_N & y_N \end{bmatrix}$$

Each keypoint is predicted as a 2D random variable, normally distributed with location (x', y') and (circular) standard deviation $\sigma$. For a predicted keypoint random variable, the relative likelihood that a sample from that random variable will equal the ground truth keypoint location is:

$$\frac{1}{2\pi\sigma^2} e^{-\frac{(x-x')^2+(y-y')^2}{2\sigma^2}}$$

For the full set of N keypoints, a set of coordinates are predicted $S \in \mathbb{R}^N$:

$$S = [\sigma_0, \sigma_1, \ldots, \sigma_N]$$

We work with log-likelihoods as they are more convenient. Since it is desired to maximize the log-likelihood that samples from each predicted keypoint equal the ground truth, a loss is minimized that is the sum of negative log likelihoods.

$$\begin{aligned}
\text{Loss} &= \sum_{i=0}^{N} -\log\left(\frac{1}{2\pi\sigma_i^2} e^{-\frac{(x_i-x'_i)^2+(y_i-y'_i)^2}{2\sigma_i^2}}\right) \\
&\sum_{i=0}^{N}\left(-\log\frac{1}{2\pi\sigma_i^2} - \log e^{-\frac{(x_i-x'_i)^2+(y_i-y'_i)^2}{2\sigma_i^2}}\right) \\
&\sum_{i=0}^{N} -\log\frac{1}{2\pi\sigma_i^2} - \sum_{i=0}^{N} \log e^{-\frac{(x_i-x'_i)^2+(y_i-y'_i)^2}{2\sigma_i^2}} \\
&\sum_{i=0}^{N} \log(2\pi\sigma_i^2) + \sum_{i=0}^{N} \frac{(x_i-x'_i)^2+(y_i-y'_i)^2}{2\sigma_i^2}
\end{aligned}$$

For clarity, this is split into two parts:

$$\text{Loss} = \text{Loss}_\sigma + \text{Loss}_\mu \text{ where}$$

$$\text{Loss}_\sigma = \sum_{i=0}^{N} \log(2\pi\sigma_i^2) \text{ and } \text{Loss}_\mu = \sum_{i=0}^{N} \frac{(x_i-x'_i)^2+(y_i-y'_i)^2}{2\sigma_i^2}$$

$\text{Loss}_\sigma$ penalizes the network for being too uncertain about keypoint predictions, and $\text{Loss}_\mu$ penalizes the network for making poorly localized keypoint predictions. Additionally, the symmetric Gaussian in the above example may be extended to non-symmetric Gaussian, in some cases.

The distribution of uncertainty values can also be influenced at training time by introducing a suitable prior. The formulation above assumes a uniform prior over the predicted sigmas. A natural choice of prior on sigma (or precision) of the (2D) Gaussian distribution is the Wishart distribution (the conjugate prior of a Gaussian distribution) although others can be used. This prior is a gamma distribution in the univariate case. This has the effect of encouraging the network at training time to allocate more neural resources to cases where it is currently doing poorly (where sigma is large) and less neural resources to where it is already comparatively certain (where sigma is small) in order to balance the usefulness of its keypoint predictions to downstream model fitting. See below for the derivation assuming Gamma prior.

Definitions (Precision, Gaussian distribution, Gamma or Wishart)

$$\text{Precision } \tau := \frac{1}{\sigma^2}$$

$$p(x, \tau) = \mathcal{N}(x \mid \tau) Gam(\tau)$$

$$\mathcal{N}(x \mid \tau) = \frac{\tau}{2\pi} e^{-\tau(x-\mu)^2/2}$$

a and b are (manually) tuned constants "shape and inverse scale"

$$Gam(\tau \mid a, b) := \frac{1}{\Gamma(a)} b^a \tau^{a-1} e^{-b\tau}$$

Per Keypoint Log Likelihood Derivation

Maximise $p$ by minimising $-\log(p)$ $-\log(p) = -\log(\mathcal{N}) - \log(Gam)$ $-\log(\mathcal{N}) = \log(2\pi) - \log(\tau) + \tau(x-\mu)^2/2$ $-\log(Gam) = -\log \frac{b^a}{\Gamma(a)} - (a-1)\log(\tau) + b\tau$ Per Keypoint Loss Term for Gamma Prior
The first term $$-\log \frac{b^a}{\Gamma(a)}$$

is constant so has no effect on training (ignore it). Add the following instead of $-\log(Gam)$ to the loss:

=>Loss+=$b\tau$−(a−1)log(σ)

The same in terms of σ:

$$\Rightarrow \text{Loss} \mathrel{+}= \frac{b}{\sigma^2} + 2(a-1)\log(\sigma)$$

Additionally, object detection via keypoint uncertainty may be implemented. A sliding window may be applied over an image, and average keypoint confidence for each window may be measured. If a window with a high average keypoint certainty is not found, it can be determined that the object is not in the image. Otherwise, the window which reported the highest average keypoint confidence may be taken to contain the object.

Some of the use cases enabled using the described techniques include receiving image input from regular color (RGB) cameras rather than depth cameras, prediction of many more landmarks, and use cases in combination with a model fitter that predicts intrinsic camera parameters (e.g., focal length). This is important to achieve good results for recovering 3D structure from RGB images taken by a variety of cameras. Additional use cases include performing 3D reconstruction from multiple views, where the uncertainty in each view is taken into account, and where the extrinsic parameters of each camera are simultaneously optimized. More generally, the image inputs may be received from various types of cameras such as web cameras, depth, cameras on a head-mounted display (HMD), IR cameras, event cameras, etc. and the images can be RGB, depth mapped, IR, etc., Placement of the cameras can be outside-in (e.g., sensors are stationary as in web cams), or introspective positional tracking, where the cameras or sensors are located on the device being tracked (e.g., HMD). In the case of HMDs, the dense landmarks on the observed parts of the face may also be used to localize the HMD itself relative to the face.

This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
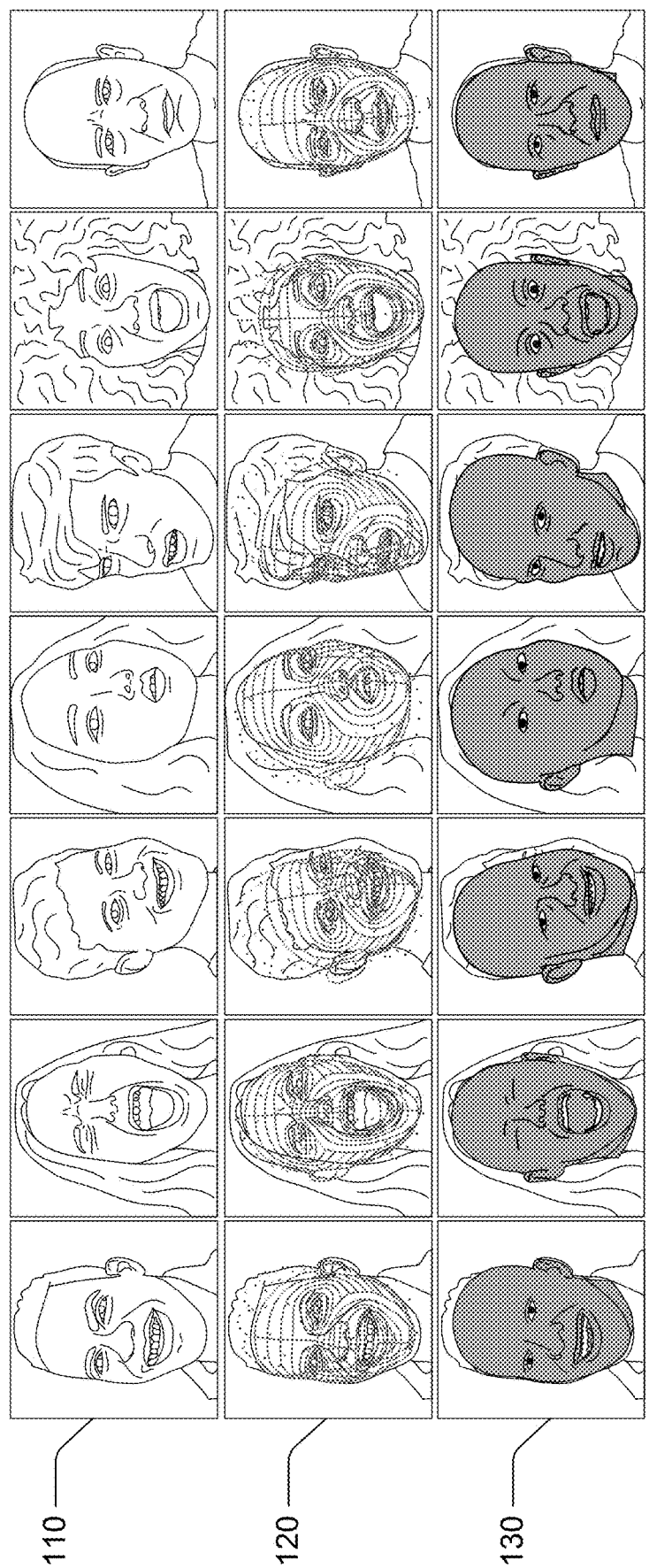
FIG. 1 is a diagram illustrating examples of the disclosed techniques according to one embodiment disclosed herein.
Figure 2:
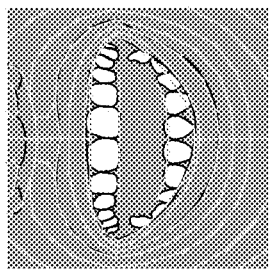
FIG. 2 is a diagram illustrating examples of the disclosed techniques according to one embodiment disclosed herein.
Figure 2:
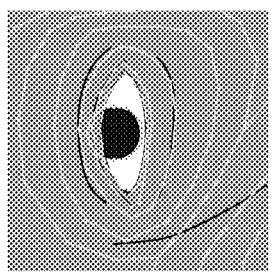
Figure 2:
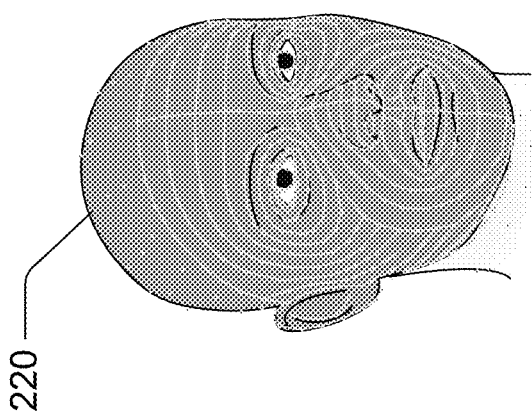
Figure 2:
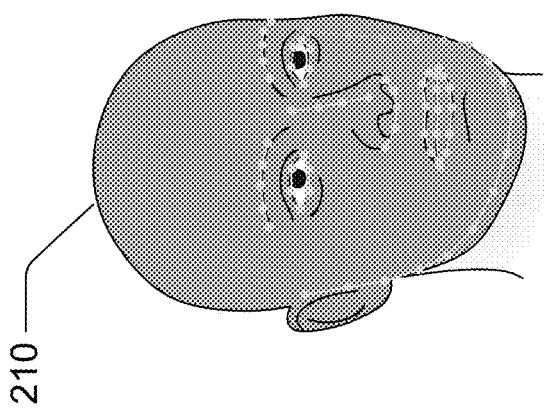

A keypoint is typically localized in an image by having a neural network generate a heatmap image, where the heatmap has high pixel values in parts of the image close to the keypoint, and low pixel values in parts of the image far away from the keypoint. Another algorithm may be run on the heatmap image (argmax) to find the largest value which is the peak. The location of the peak is the 2D location of the keypoint. The value of the peak of the heatmap may sometimes be used as a measure of uncertainty.

The disclosure provides a way to directly regress a 2D coordinate and a measure of uncertainty without using heatmap images. This has several technical advantages:

Generating heatmap images is computationally expensive. In fact, drawing these heatmaps can be the most expensive part of the neural network. With direct keypoint regression, this computation time can be saved.

In a multi-core system, transferring heatmap images from one core to another can be a bottleneck. Instead, transferring just the keypoint coordinates and confidence values uses much less bandwidth. For a 128×128 image, this corresponds to over a 99% improvement in bandwidth.

In a computationally constrained system, running argmax on the heatmap images can be expensive. By directly regressing keypoints, running argmax can be avoided. Additionally, argmax is only pixel-precise, whereas direct regression can be more precise at the sub-pixel level.

Directly predicting keypoints can allow for scaling up to more keypoints than would be computationally possible with heatmaps.

By predicting uncertainty in the manner described, it may be more clear how to best use uncertainty estimates in further systems, since sigma will be in the same units as the prediction. When heatmap-peak values are used as a measure of uncertainty, it does not have an obvious unit for integration in further systems.

By penalizing the uncertainties at training time with a suitable prior, the resources of the neural network can be automatically allocated in order to achieve greater equality of outcome with regards to its prediction accuracy, with more capacity as necessary being assigned to harder keypoints.

In some embodiments, the disclosed techniques can be used to train a neural network that predicts 2D keypoints in RGB images. The disclosed techniques can also be used, for example, to efficiently create depth maps. The rigid pose may then be computed by using a Perspective-n-Point solver, where these uncertainty values are used to weigh the 2D projection error of each keypoint. The keypoints occluded by objects or with higher motion blur may have higher uncertainty values.

The disclosed techniques may be applied to a multi-camera fitting scenario, where a model of an object (e.g., face) is fitted to 2D probabilistic keypoint estimates that come from multiple cameras. Some keypoints under certain views may be less certain compared to the same keypoint under a different view. For example, when a face is viewed from the front, both eyes may be clearly visible with high confidence. But, when viewed from the side, only one eye may be visible, and the other eye may be discounted by high uncertainty when fitting to that view. In this way, although all keypoints are predicted for all views, each view of the face contributes most strongly to the portion of the face best visible. Additionally, when using a probabilistic keypoint energy over multiple cameras, it is possible to use the camera calibration itself. In some embodiments, the extension of fitting model to landmarks can allow for camera calibration to be performed together with other parameters.

Regarding object detection via keypoint uncertainty, in existing methods, training object detectors requires "positive" images that contain the object, as well as "negative" images that do not contain the object. With the disclosed techniques, no negative images are required, making it possible to create an object detector trained with only positive images. This can be useful when it is difficult to reliably collect negative images, e.g., images without a person in the images.

Landmarks are points in correspondence across all faces, such as the tip of the nose or the corner of the eye. They often play a role in face-related computer vision, e.g., being used to extract facial regions of interest, or helping to constrain 3D model fitting. However, many aspects of facial identity or expression cannot be encoded by a typical sparse set of 68 landmarks alone. For example, without landmarks on the cheeks, we cannot tell whether or not someone has high cheek-bones. Or, without landmarks around the outer eye region, we cannot tell if someone is softly closing their eyes, or scrunching up their face.

In order to reconstruct faces more accurately, previous work has therefore used additional signals beyond color images, such as depth images or optical flow. However, these signals may not be available or reliable to compute. Instead, given color images alone, others have approached the problem using analysis-by-synthesis: minimizing a photometric error between a generative 3D face model and an observed image using differentiable rendering.

However, these approaches are limited by the approximations that must be made in order for differentiable rendering to be computationally feasible. In reality, faces are not purely Lambertian, and many important illumination effects are not explained using spherical harmonics alone, e.g., ambient occlusion or shadows cast by the nose.

It would be desirable to just use more landmarks, which disclosed embodiments describe. Examples of the present disclosure include a method that predicts over 700 landmarks both accurately and robustly. Instead of only the frontal "hockey-mask" portion of the face, the described landmarks cover the entire head, including the ears, eyeballs, and teeth. As shown in FIG. 1, these landmarks provide a rich signal for both facial identity and expression. In FIG. 1, given a single image (top), we first robustly and accurately predict 703 landmarks (middle). To aid visualization, we draw lines between landmarks. We then fit the disclosed 3D morphable face model to these landmarks to reconstruct faces in 3D (bottom).

Even with as few as 68 landmarks, it is difficult to precisely define landmarks that do not align with a salient image feature. Thus synthetic training data may be used which guarantees consistent annotations. Furthermore, instead of representing each landmark as just a 2D coordinate, we predict each one as a 2D random variable: a 2D circular Gaussian with position and uncertainty. This allows the predictor to express uncertainty about certain landmarks, e.g., occluded landmarks on the back of the head, and also improves landmark accuracy.

Since the disclosed dense landmarks represent points of correspondence across all faces, we can perform 3D face reconstruction by fitting a morphable face model to them. Although previous approaches have fit morphable models to landmarks in a similar way, the present disclosure shows that landmarks are the only signal required to achieve state of the art results for monocular face reconstruction in the wild. All that is required is enough landmarks, that are predicted with sufficient accuracy.

The probabilistic nature of the predictions also makes them ideal for fitting a 3D model over a temporal sequence, or across multiple views. An optimizer can discount uncertain landmarks, and rely on more certain ones. The present disclosure demonstrates this with accurate and expressive results for both multi-view and monocular facial performance capture. Finally, the present disclosure shows that predicting dense landmarks and model fitting can be highly efficient, demonstrating real-time facial performance capture at over 60 FPS on a single CPU thread.

The present disclosure shows that parametric appearance models, illumination models, or differentiable rendering are not needed for high-quality 3D face reconstruction, but only a number of accurate 2D landmarks and a 3D model to fit to them. In addition, the present disclosure shows that combining probabilistic landmarks and model fitting enables intelligently aggregation of face information across multiple images by demonstrating robust and expressive results for both multi-view and monocular facial performance capture.

Figure 3:
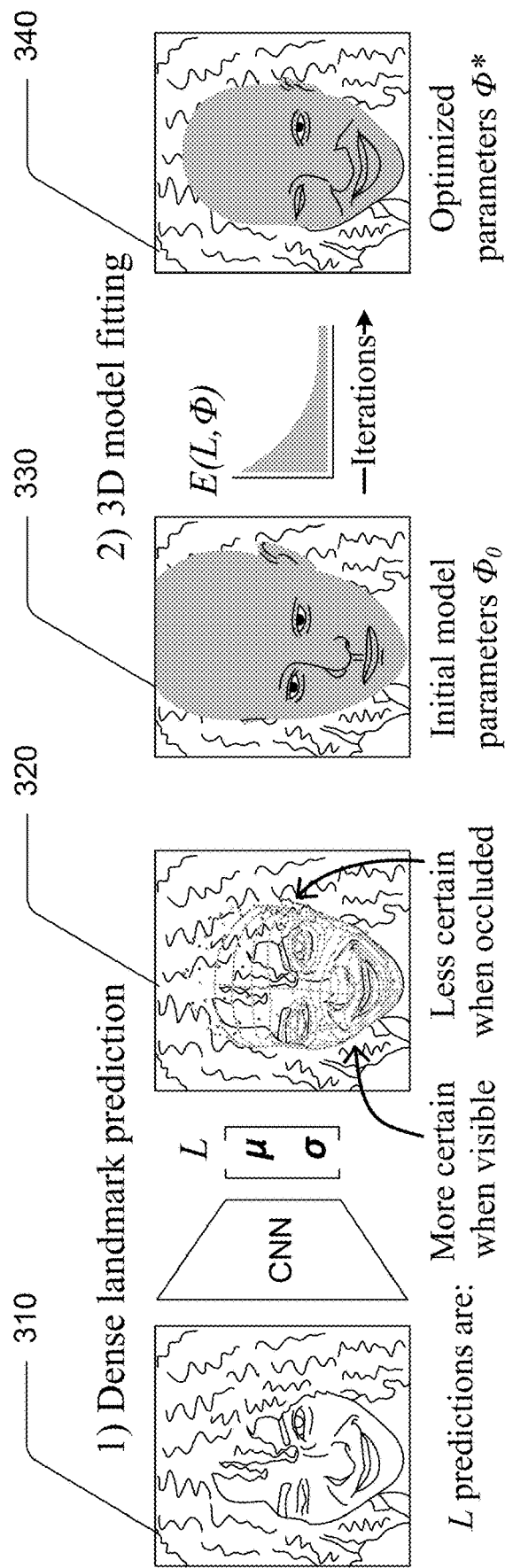
FIG. 3 is a diagram illustrating examples of the disclosed techniques according to one embodiment disclosed herein.

In recent years, methods for 3D face reconstruction have become increasingly complicated, involving differentiable rendering and complex neural network training strategies. In contrast, the present disclosure proposes effective methods by maintaining simplicity. The disclosed approach consists of two stages: First we predict probabilistic dense 2D landmarks L using a traditional convolutional neural network (CNN). Then, we fit a 3D face model, parameterized by $\Phi$, to the 2D landmarks by minimizing an energy function $E(\Phi; L)$. Images themselves are not part of this optimization; the only data used are 2D landmarks. Referring to FIG. 3, given an image 310, we first predict probabilistic dense landmarks L 320, each with position $\mu$ and certainty $\sigma$. Then, we fit our 3D face model 330 to L, minimizing an energy E by optimizing model parameters $\Phi$ 340.

One difference between the disclosure and previous approaches is the number and quality of landmarks. Previous approaches have not predicted many 2D landmarks with such accuracy. This allows high quality 3D face reconstruction results by fitting a 3D model to these landmarks alone.

Probabilistic landmark regression. We predict each landmark as a random variable with probability density function of a circular 2D Gaussian.

$$p(x,\sigma) = \mathcal{N}(x|\theta)p(\sigma)$$

$$p(\sigma)=1$$

Figure 4:
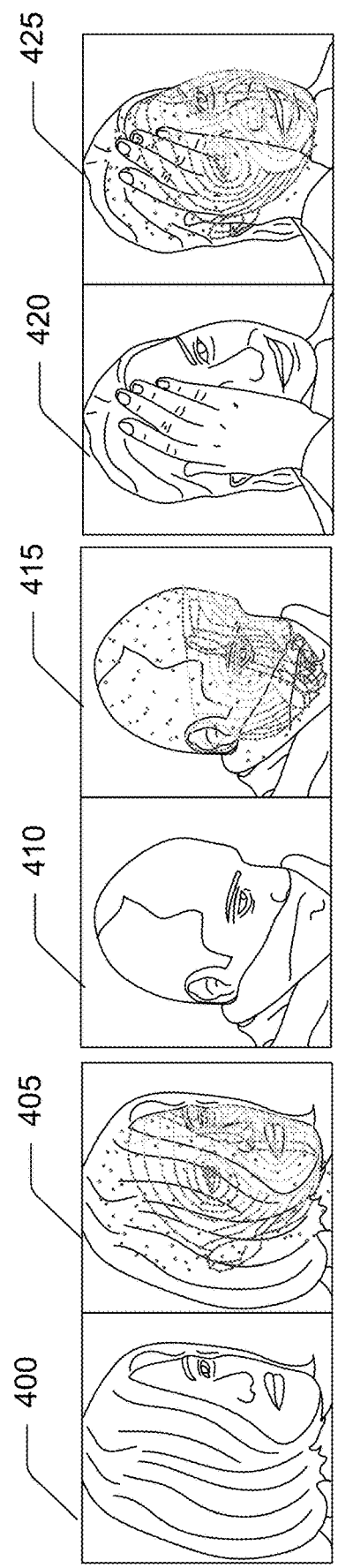
FIG. 4 is a diagram illustrating examples of the disclosed techniques according to one embodiment disclosed herein.

So $Li=\{\mu i, \sigma i\}$, where $\mu i=[xi, yi]$ is the expected position of that landmark, and $\sigma i$ (the standard deviation) is a measure of uncertainty. Our training data includes labels for landmark positions $\mu'i=[x'i, y'i]$, but not for $\sigma$. The network learns to output $\sigma$ to show that it is certain about some landmarks, e.g., visible landmarks on the front of the face, and uncertain about others, e.g., landmarks hidden behind hair. Referring to FIG. 4, when parts of the face are occluded by, for example, hair 400, clothing 410, or a hand 420, the corresponding landmarks shown in 405, 415, 425 may be predicted with high uncertainty (red), compared to those visible (green). This may be achieved by training the network with a Gaussian negative log likelihood (GNLL) loss:

$$Loss = \sum_{i=1}^{|L|} \lambda_i \left( \underbrace{\log(\sigma_i^2)}_{Loss_\sigma} + \underbrace{\frac{\|\mu_i - \mu'_i\|^2}{2\sigma_i^2}}_{Loss_\mu} \right) \quad (3)$$

$Loss_\sigma$ penalizes the network for being too uncertain, and $Loss_\mu$ penalizes the network for making poorly localized landmark predictions while penalizing certainty. $\lambda_i$ is a per-landmark weight that focuses the loss on certain parts of the face. This is the only loss term used during training.

The disclosed embodiments enable prediction of occluded keypoints and keypoints outside of an image, which can be applied in at least two ways—to the ground truth, or to the network predictions. For ground truth, the use of synthetic training data makes it easier to create representative/accurate ground truth for keypoints that are not observed by the camera/sensor. For network predictions, it is not possible to predict keypoints outside of the image when using a heatmap approach, which is an important advantage of the keypoint regression as disclosed herein.

Landmarks are commonly predicted via heatmaps. However, generating heatmaps is computationally expensive. Instead, we keep things simple, and directly regress position and uncertainty using a traditional CNN. We take any off-the-shelf architecture, e.g., ResNet and change the final fully-connected layer to output three values per-landmark: two for position and one for uncertainty.

Figure 5:
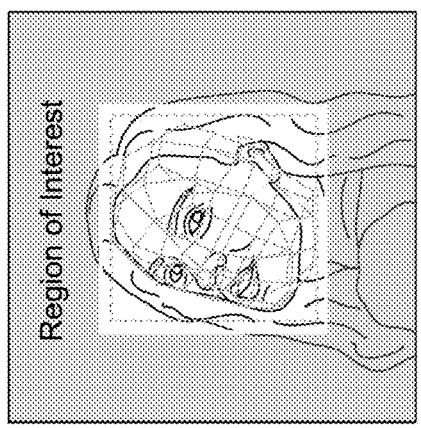
FIG. 5 is a diagram illustrating examples of the disclosed techniques according to one embodiment disclosed herein.
Figure 5:
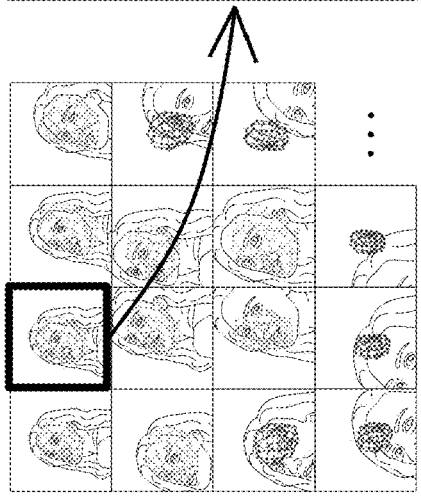
Figure 5:
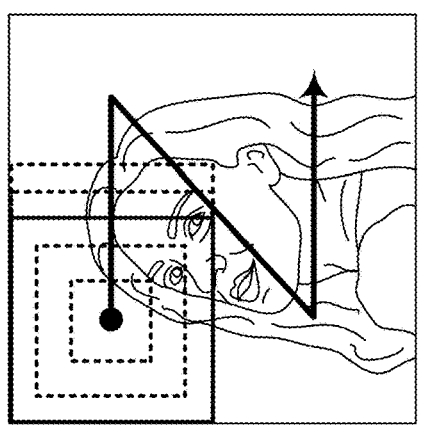
Figure 5:
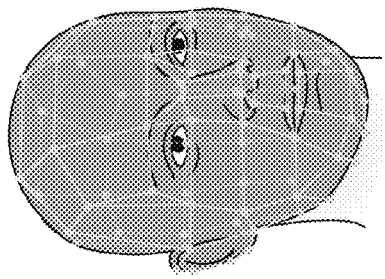

Landmark coordinates are normalized from [0, S] to [−1, 1], for a square image of size S×S. Rather than directly outputting $\sigma$, we predict log $\sigma$, and take its exponential to ensure $\sigma$ is positive. We train PyTorch models from the timm library using the AdamW optimizer. FIG. 5 explains how we extract Regions-of-Interest (ROI) on which to run our dense landmark CNN. To extract a facial Region-of-Interest (ROI) from a full image we run a full-head sparse landmark CNN (a) on multi-scale sliding windows (b) and select the window with the lowest mean uncertainty (c) as our ROI (d). We perform appearance and geometric data augmentation to help our synthetic data cross the domain gap.

Given probabilistic dense 2D landmarks L, one goal is to find optimal model parameters $\Phi^*$ that minimize the following energy:

$$E(\Phi; L) = \underbrace{E_{landmarks}}_{Data\ term} + \underbrace{E_{identity} + E_{expression} + E_{joints} + E_{temporal} + E_{intersect}}_{Regularizers}$$

$E_{landmarks}$ is the only term that encourages the 3D model to explain the observed 2D landmarks. The other terms use prior knowledge to regularize the fit.

An advantage of the disclosed approach is how naturally it scales to multiple images and cameras. Described herein is the general form of the disclosed method, suitable for F frames over C cameras, i.e., multi-view performance capture. In the monocular case, C=1, simplifying some terms.

3D face model. A linear face model may be used, comprising N=7,667 vertices and K=4 skeletal joints (the head, neck, and two eyes). Vertex positions may be determined by the mesh-generating function M $(\beta, \psi, \theta)$: $R|\beta|+|\psi|+|\theta| \rightarrow R3N$ which takes parameters $\beta \in R|\beta|$ for identity, $\psi \in R|\psi|$ for expression, and $\theta \in R3K+3$ for skeletal pose (including root joint translation).

$$\mathcal{M}(\beta,\psi,\theta) = \mathcal{L}(\mathcal{T}(\beta,\psi),\theta, \mathcal{J}(\beta); W)$$

where $\mathcal{L}$ (V,θ,J;W) is a standard linear blend skinning (LBS) function that rotates vertex positions V∈ $\mathbb{R}^{3N}$ about joint locations J∈ $\mathbb{R}^{3K}$ by local joint rotations in θ, with per-vertex weights W∈ $\mathbb{R}^{K \times N}$. The face mesh and joint locations in bind pose are determined by $\mathcal{T}$ (β,ψ): $\mathbb{R}^{|\beta|+|\psi|} \to \mathbb{R}^{3N}$ and $\mathcal{J}$ (β): $\mathbb{R}^{|\beta|} \to \mathbb{R}^{3K}$ respectively.

To simplify notation, it can be assumed that the mesh contains landmark vertices only.

Camera model. Perspective cameras are assumed. Each is described by a world-to-camera rigid transform X∈ $\mathbb{R}^{3 \times 4}$= [R|T] comprising rotation and translation, and a pinhole projection Matrix Π∈ $\mathbb{R}^{3 \times 3}$. So, the image-space, projection of the $j^{th}$ landmark in the $i^{th}$ camera is $x_{i,j}=\Pi_i X_i \mathcal{M}_j$. In the monocular case, X is the identity transform and can be ignored.

Parameters Φ may be optimized to minimize E. The main parameters of interest control the face, but camera parameters can also be optimized if they are unknown or known to be imprecise.

$$\Phi = \left\{ \underbrace{\beta, \Psi_{F \times |\psi|}, \Theta_{F \times |\theta|}}_{Face}; \underbrace{R_{C \times 3}, T_{C \times 3}, f_C}_{Camera(s)} \right\}$$

Facial identity β is shared over a sequence of F frames, but expression Ψ and pose Θ vary per frame. For each of ow C cameras we have six degrees of freedom for rotation R and translation T, and a focal length parameter f (assuming square pixels and principal point at image center). In the monocular case, we only optimize focal length.

$E_{landmarks}$ encourages the 3D model to explain the predicted 2D landmarks.

$$E_{landmarks} = \sum_{i,j,k}^{F,C,|L|} \frac{\|x_{ijk} - \mu_{ijk}\|^2}{2\sigma_{i,j,k}^2} \quad (4)$$

where for the $k^{th}$ landmark seen by the $j^{th}$ camera in the $i^{th}$ frame, [$\mu_{ijk}$, $\sigma_{ijk}$] is the 2D location and uncertainty predicted by our dense landmark CNN, and $x_{ijk}=\Pi_i X_j \mathcal{M}(\beta,\psi_i,\theta_i)_k$ is the 2D projection of that landmark on our 3D model. The similarity of Equation 4 to $Loss_\mu$ in Equation 3 is no accident: treating landmarks as 2D random variables during both prediction and model-fitting allows our approach to elegantly handle uncertainty, taking advantage of landmarks the CNN is confident in, and discounting those it is uncertain about.

$E_{identity}$ penalizes unlikely face shape by maximizing the relative log-likelihood of shape parameters β under a multivariate Gaussian Mixture Model (GMM) of G components. This GMM was fit to the library of 3D head scans used to train our 3D face model. So, $E_{identity}=-\log(p(\beta))$ where $p(\beta)=\sum_{i=1}^{G} \gamma_i \mathcal{N}(\beta|v_i, \Sigma_i)$ $v_i$ and $\Sigma_i$ are the mean and covariance matrix of the $i^{th}$ component, and $\gamma_i$ is the weight of that compartment.

$E_{expression}=\|\psi\|^2$ and $E_{joints}=\|\theta_{k,i \in [2,K]}\|^2$ encourage optimizer to explain the data with as little expression and joint rotation to passible. We do not penalize global translation or rotation by ignoring the root joint $\theta_1$.

$E_{temporal}=\sum_{i=2,j,k}^{F,C,|L|} \|x_{i,j,k}-x_{i-1,j,k}\|^2$ reduces jitter by encouraging face mesh vertices x to remain still between neighboring frames i−1 and i.

$E_{intersect}$ encourages the optimizer to find solutions without intersections between the skin and eyeballs or teeth.

Figure 6:
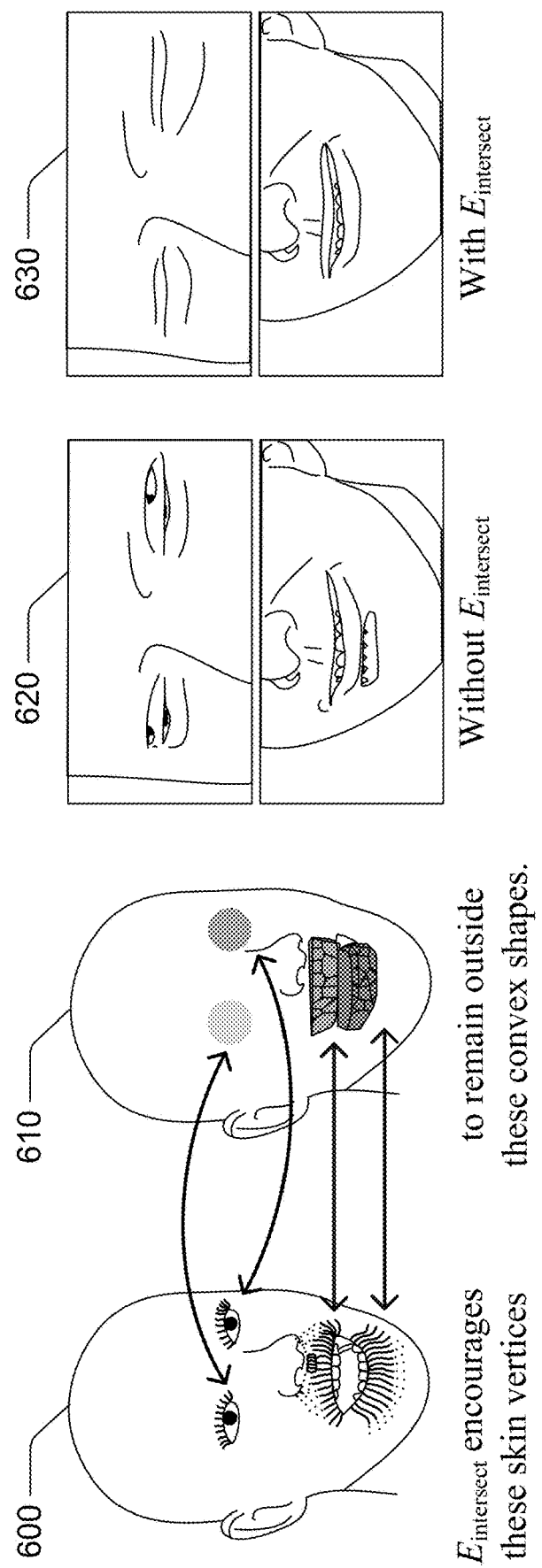
FIG. 6 is a diagram illustrating examples of the disclosed techniques according to one embodiment disclosed herein.

Referring to FIG. 6, $E_{intersect}$ encourages skin vertices in image 600 to remain outside the convex shapes as shown in image 610. Image 620 shows the result 630 without $E_{intersect}$, and the result 640 with $E_{intersect}$.

Real-time model fitting. We use the Levenberg-Marquardt algorithm to optimize our model fitting energy. We rewrite the energy E in terms of the vector of residuals, r, as $E(\Phi)=\|r(\Phi)\|^2=\Sigma_i r_i(\Phi)^2$. Then at each iteration k of our optimization, we can compute $r(\Phi_k)$ and the Jacobian, $$J(\Phi_k) = \frac{\partial r(\Phi)}{\partial \Phi}|^{\Phi=\Phi_k},$$

and use these to solve the symmetric, positive-semi-definite linear system, $(J^T J+\lambda \text{diag}(J^T J))\delta_k=-J^T r$ via Cholesky decomposition. We then apply the update rule, $\Phi_{k+1}=\Phi_k+\delta_k$.

In practice it is not necessary to form the residual vector r nor the Jacobian matrix J. Instead, for performance reasons, the quantities $J^T J$ and $J^T r$ are directly computed as we visit each term $r_i(\Phi k)$ of the energy. Most of the computational cost is incurred in evaluating these products for the landmark data term, as expected. However, the Jacobian of landmark term residuals is not fully dense. Each individual landmark depends on its own subset of expression parameters, and is invariant to other expression parameters. A static analysis of the sparsity of each landmark term may be performed with respect to parameters, $\partial r_i/\partial \Phi_j$, and we this set of i, j indices to reduce the cost of our outer products from $O(n^2)$ to $O(m_i^2)$, where $\Phi \in \mathbb{R}^n$ and $m_i$ is the sparsified dimensionality of $\partial r_i/\partial \Phi^T$. We further enhance the sparsity by ignoring any components of the Jacobian with an absolute value below a certain empirically-determined threshold.

By exploiting sparsity in this way, the landmark term residuals and their derivatives become very efficient to evaluate. This formulation avoids the correspondence problem usually seen with depth images, which requires a more costly optimization. In addition, adding more landmarks only grows the DNN in the last fully-connected layer. It therefore becomes possible to implement a very detailed and well-regularized fitter with a relatively small compute burden, simply by adding a sufficient number of landmarks. The cost of the Cholesky solve for the update δk is independent of the number of landmarks.

Figure 7A:
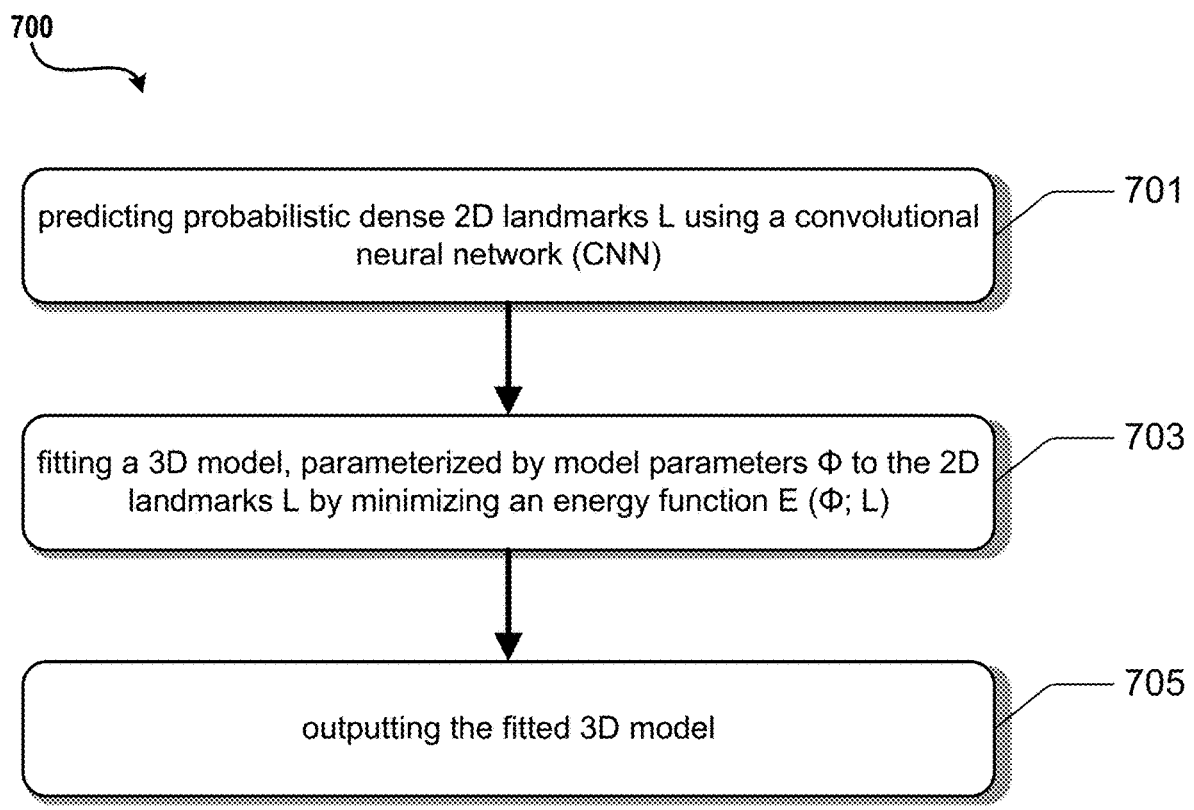
FIG. 7A is a flow diagram showing aspects of an illustrative routine, according to one embodiment disclosed herein.

Turning now to FIG. 7A, illustrated is an example operational procedure for predicting keypoints in an image in accordance with the present disclosure. Such an operational procedure may be provided by one or more components illustrated in FIG. 1 through 6 or 9 through 11. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 700 is described as running on a system, it can be appreciated that the routine 700 and other operations described herein can be executed on an individual computing device or several devices.

Referring to FIG. 7A, operation 701 illustrates predicting probabilistic dense 2D landmarks L using a convolutional neural network (CNN).

Operation 701 may be followed by operation 703. Operation 703 illustrates fitting a 3D model, parameterized by model parameters Φ to the 2D landmarks L by minimizing an energy function E (Φ; L).

Operation 703 may be followed by operation 705. Operation 703 illustrates fitting a 3D model, parameterized by model parameters Φ to the 2D landmarks L by minimizing an energy function E (Φ; L).

Figure 7B:
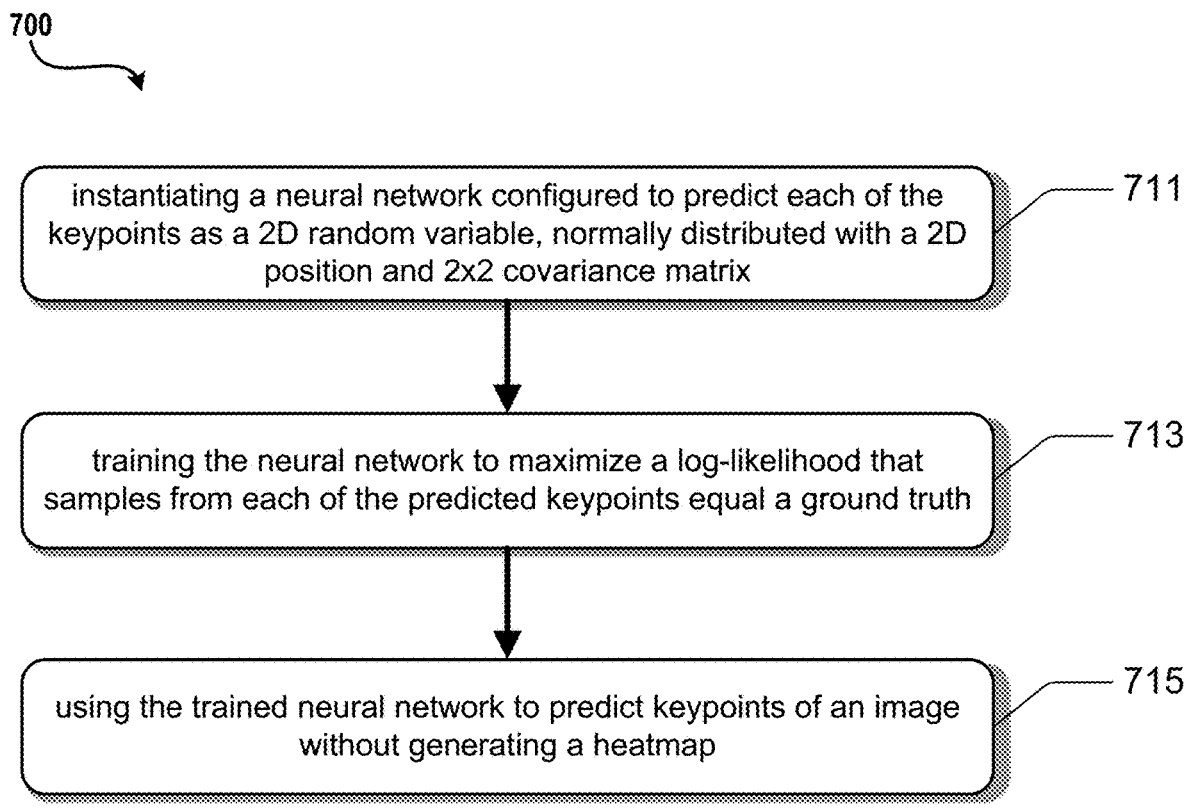
FIG. 7B is a flow diagram showing aspects of an illustrative routine, according to one embodiment disclosed herein.

Turning now to FIG. 7B, illustrated is another example operational procedure for predicting keypoints by a computing system in accordance with the present disclosure. Referring to FIG. 7, operation 711 illustrates instantiating, by the computing system, a neural network configured to predict each of the keypoints as a 2D random variable, normally distributed with a 2D position and 2×2 covariance matrix.

Operation 711 may be followed by operation 713. Operation 713 illustrates training, by the computing system, the neural network to maximize a log-likelihood that samples from each of the predicted keypoints equal a ground truth.

Operation 713 may be followed by operation 715. Operation 715 illustrates using the trained neural network to predict keypoints of an image without generating a heatmap.

Figure 8A:
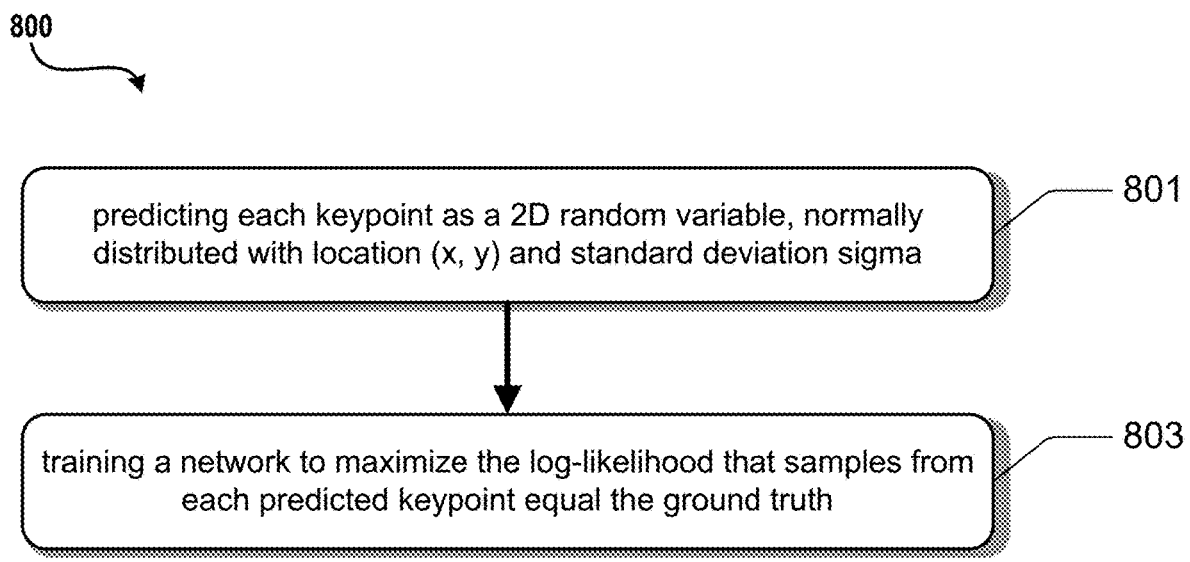
FIG. 8A is a flow diagram showing aspects of an illustrative routine, according to one embodiment disclosed herein.

Turning now to FIG. 8A, illustrated is another example operational procedure for predicting keypoints in an image in accordance with the present disclosure. Such an operational procedure may be provided by one or more components illustrated in FIGS. 1 through 6 and 9 through 11. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

Referring to FIG. 8A, operation 801 illustrates predicting each keypoint as a 2D random variable, normally distributed with location (x, y) and standard deviation sigma.

Operation 801 may be followed by operation 803. Operation 803 illustrates training a network to maximize the log-likelihood that samples from each predicted keypoint equal the ground truth.

Figure 8B:
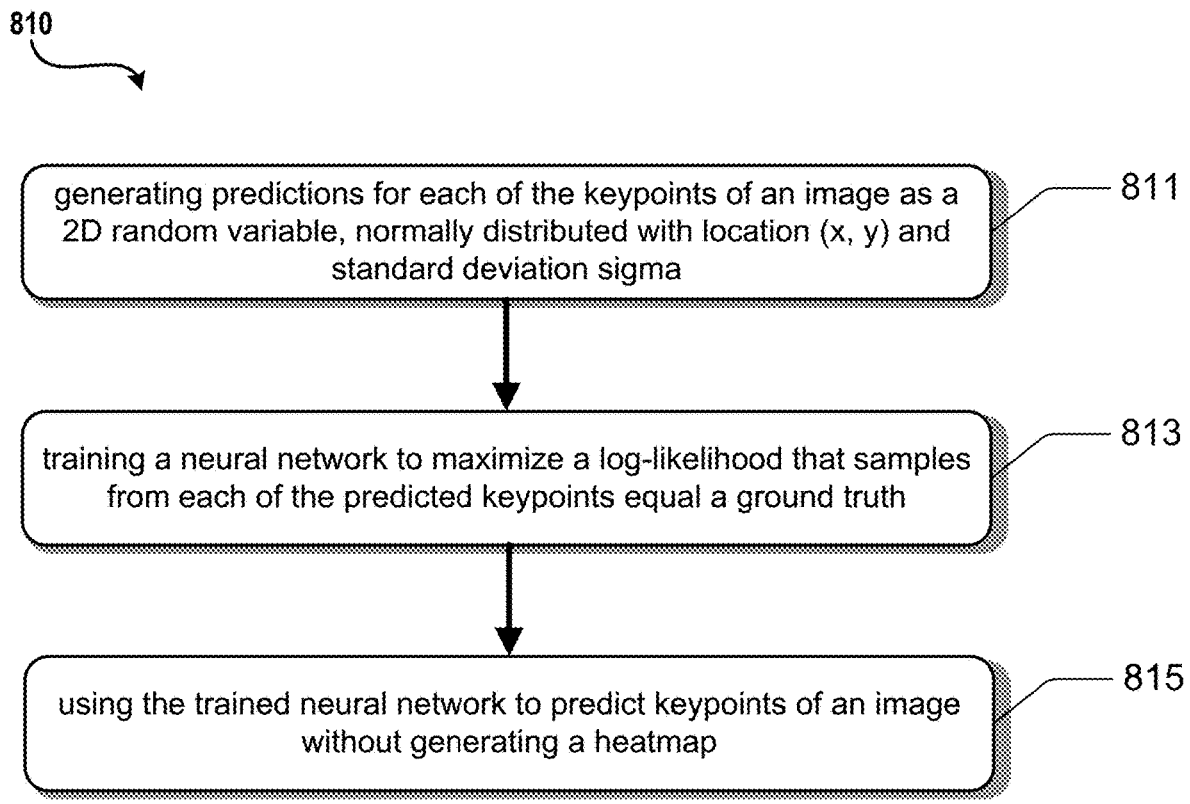
FIG. 8B is a flow diagram showing aspects of an illustrative routine, according to one embodiment disclosed herein.

Turning now to FIG. 8B, illustrated is another example operational procedure for predicting keypoints in an image in accordance with the present disclosure. Referring to FIG. 8, operation 811 illustrates generating, by the computing system, predictions for each of the keypoints of an image as a 2D random variable, normally distributed with location (x, y) and standard deviation sigma.

Operation 811 may be followed by operation 813. Operation 813 illustrates training, by the computing system, a neural network to maximize a log-likelihood that samples from each of the predicted keypoints equal a ground truth.

Operation 813 may be followed by operation 815. Operation 815 illustrates using the trained neural network to predict keypoints of an image without generating a heatmap.

As used herein, a parametric model may be a pre-defined model that can be modified by some number of parameters. Some of these parameters can control the rotation, translation, and scale of the object (i.e. some global changes) while others control more local deformations (e.g., one number can control how much a face model "smiles"). In the fitting process, the goal is to find the value of all of these parameters that best explain the predicted keypoints.

Figure 9:
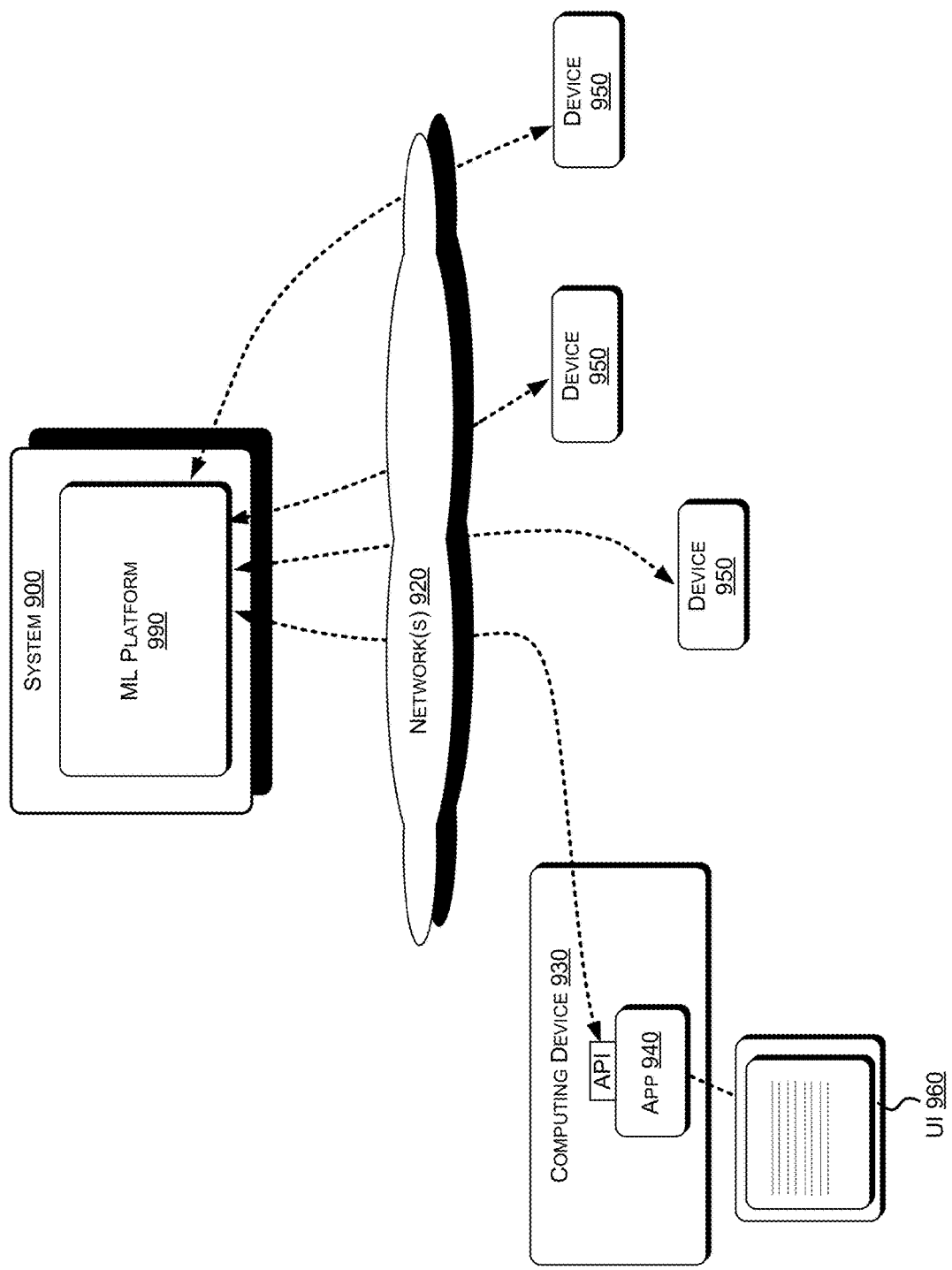
FIG. 9 is a computer architecture diagram illustrating aspects of an example computer architecture for a computer capable of executing the software components described herein.

In the example system illustrated in FIG. 9, a system 900 is illustrated that implements machine learning (ML) platform 990. The ML platform 990 may be configured to provide output data to various devices 950 over a network 920, as well as computing device 930. A user interface 960 may be rendered on computing device 993090. The user interface 960 may be provided in conjunction with an application 940 that communicates to the ML platform 990 using an API via network 920. In some embodiments, system 900 may be configured to provide product information to users. In one example, ML platform 990 may implement a machine learning system to perform one or more tasks. The ML platform 990 utilize the machine learning system to perform tasks such as image and writing recognition. The machine learning system may be configured to be optimized using the techniques described herein.

Figure 10:
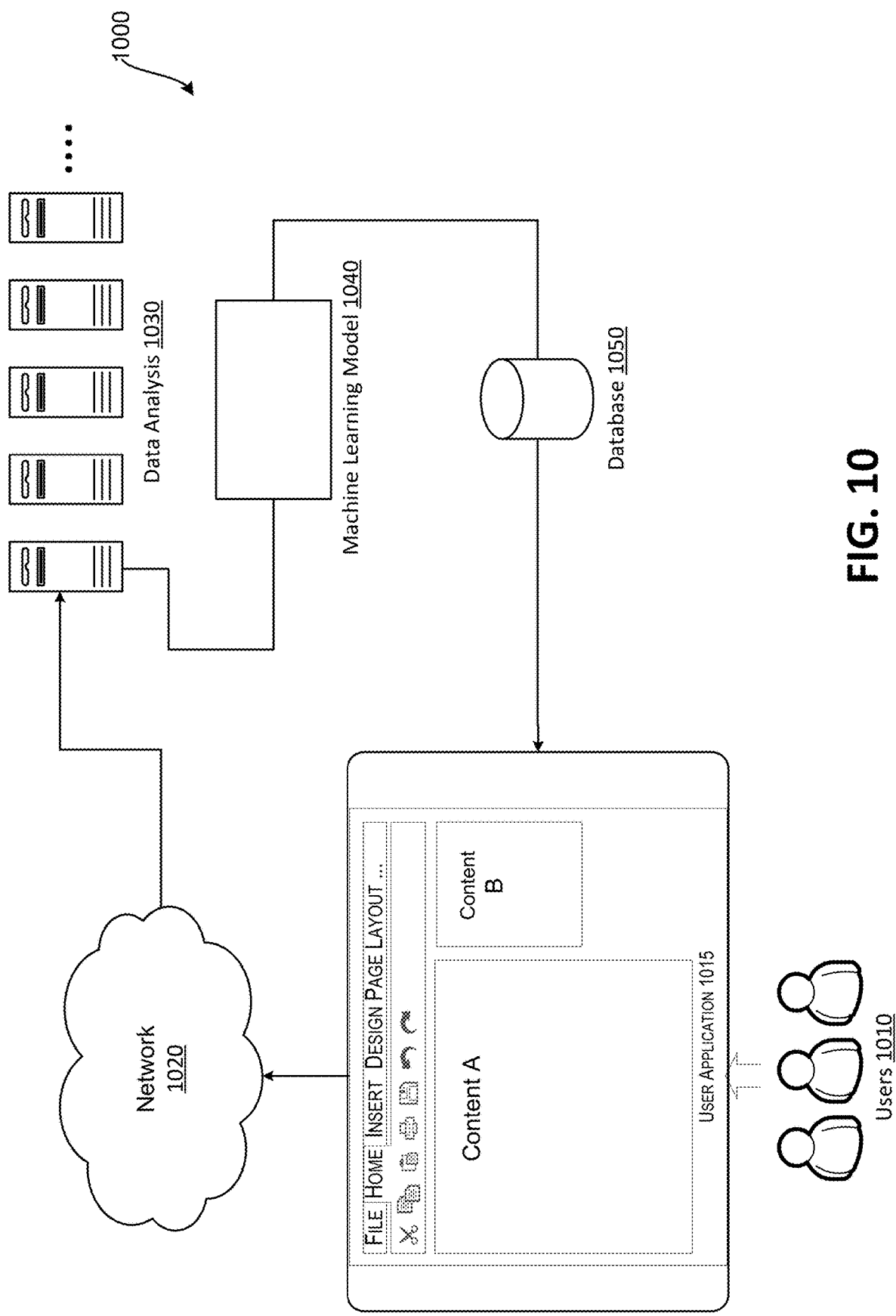
FIG. 10 is a computer architecture diagram illustrating aspects of an example computer architecture for a computer capable of executing the software components described herein.

FIG. 10 is a computing system architecture diagram showing an overview of a system disclosed herein for implementing a machine learning model, according to one embodiment disclosed herein. As shown in FIG. 10, a machine learning system 1000 may be configured to perform analysis and perform identification, prediction, or other functions based upon various data collected by and processed by data analysis components 1030 (which might be referred to individually as an "data analysis component 1030" or collectively as the "data analysis components 1030"). The data analysis components 1030 may, for example, include, but are not limited to, physical computing devices such as server computers or other types of hosts, associated hardware components (e.g., memory and mass storage devices), and networking components (e.g., routers, switches, and cables). The data analysis components 1030 can also include software, such as operating systems, applications, and containers, network services, virtual components, such as virtual disks, virtual networks, and virtual machines. The database 1050 can include data, such as a database, or a database shard (i.e., a partition of a database). Feedback may be used to further update various parameters that are used by machine learning model 1020. Data may be provided to the user application 1015 to provide results to various users 1010 using a user application 1015. In some configurations, machine learning model 1020 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

An example architecture for a real-time system in which the disclosed embodiments can be implemented include mobilenetv2. An example architecture for an offline system in which the disclosed embodiments can be implemented include resnet101. These architectures are known to those skilled in the art.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider.

Figure 11:
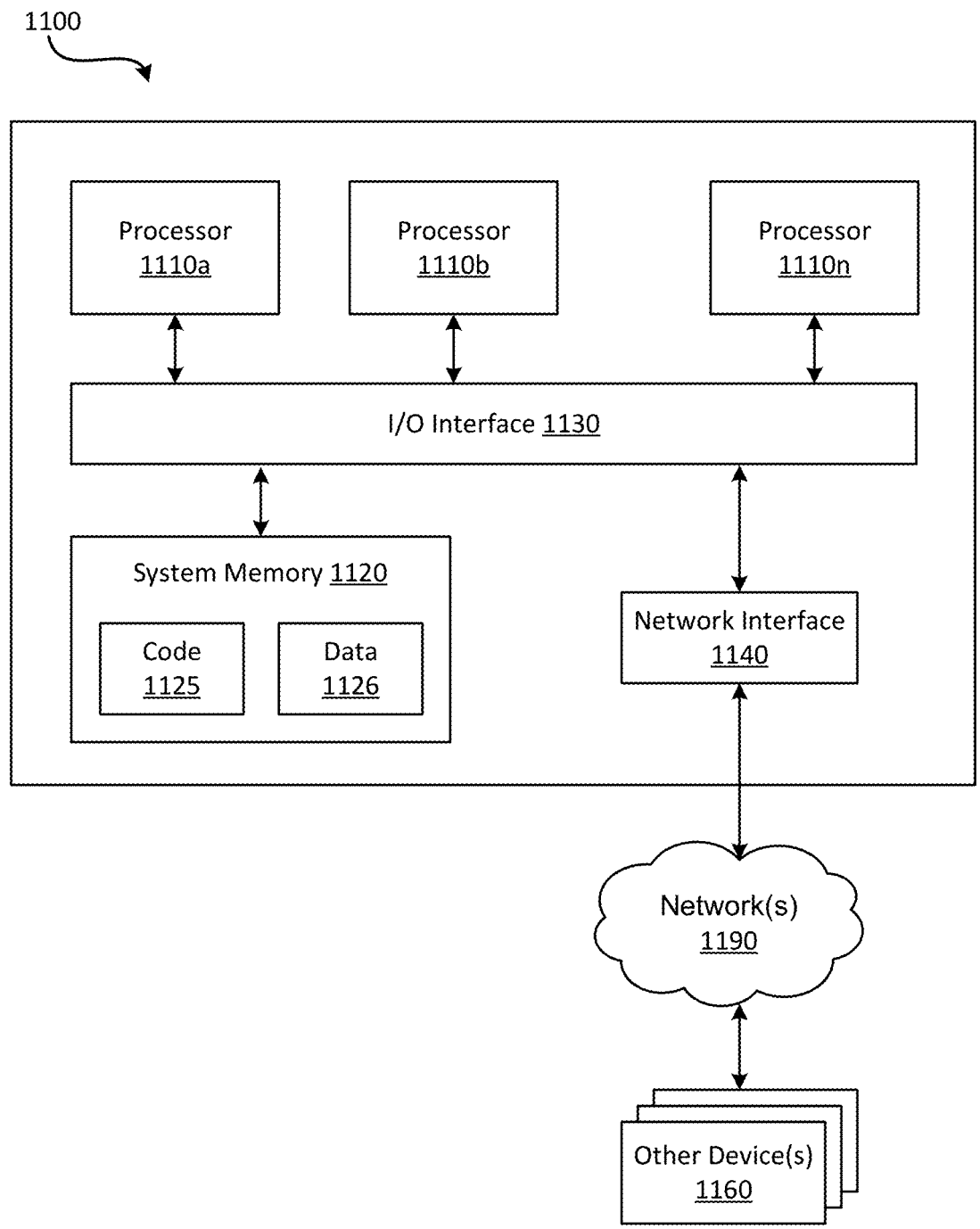
FIG. 11 is a data architecture diagram showing an illustrative example of a computer environment.

In some embodiments, a server that implements a portion or all of one or more of the technologies described herein, including the techniques to implement methods for predicting keypoints in an image may include a general-purpose computer system that includes or is configured to access one or more computer-accessible media. FIG. 11 illustrates such a general-purpose computing device 1100. In the illustrated embodiment, computing device 1100 includes one or more processors 1110*a*, 1110*b*, and/or 1110*n* (which may be referred herein singularly as "a processor 1110" or in the plural as "the processors 1110") coupled to a system memory 1120 via an input/output (I/O) interface 1130. Computing device 1100 further includes a network interface 1140 coupled to I/O interface 1130.

In various embodiments, computing device 1100 may be a uniprocessor system including one processor 1110 or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x116, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1120 as code 1125 and data 1126.

In one embodiment, I/O interface 1130 may be configured to coordinate I/O traffic between the processor 1110, system memory 1120, and any peripheral devices in the device, including network interface 1140 or other peripheral interfaces. In some embodiments, I/O interface 1130 may perform any necessary protocol, timing, or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components. Also, in some embodiments some or all of the functionality of I/O interface 1130, such as an interface to system memory 1120, may be incorporated directly into processor 1110.

Network interface 1140 may be configured to allow data to be exchanged between computing device 1100 and other device or devices 1160 attached to a network or network(s) 1190, such as other computer systems or devices as illustrated in FIGS. 1 through 7, for example. In various embodiments, network interface 1140 may support communication via any suitable wired or wireless general data networks, such as types of Ethernet networks, for example. Additionally, network interface 1140 may support communication via telecommunications/telephony networks such as analog voice networks or digital fiber communications networks, via storage area networks such as Fibre Channel SANs or via any other suitable type of network and/or protocol.

In some embodiments, system memory 1120 may be one embodiment of a computer-accessible medium configured to store program instructions and data as described above for FIGS. 1-10 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1100 via I/O interface 1130. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1100 as system memory 1120 or another type of memory. Further, a computer-accessible medium may include transmission media or signals such as electrical, electromagnetic or digital signals, conveyed via a communication medium such as a network and/or a wireless link, such as may be implemented via network interface 1140. Portions or all of multiple computing devices, such as those illustrated in FIG. 11, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 11, may include other components that are not explicitly shown in FIG. 11, or may utilize an architecture completely different than that shown in FIG. 11.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein encompasses the subject matter set forth in the following example clauses.

Clause 1: A method for predicting keypoints by a computing system, the method comprising:
  instantiating, by the computing system, a neural network configured to predict each of the keypoints as a 2D random variable, normally distributed with a 2D position and 2×2 covariance matrix;
  training, by the computing system, the neural network to maximize a log-likelihood that samples from each of the predicted keypoints equal a ground truth; and
  using the trained neural network to predict keypoints of an image without generating a heatmap.

Clause 2: The method of clause 1, wherein distribution of uncertainty values is influenced during the training by introducing a suitable prior.

Clause 3: The method of any of clauses 1-2, wherein the 2D random variable is a 2D circular Gaussian with position and uncertainty.

Clause 4: The method of any of clauses 1-3, wherein training the neural network comprises training with a Gaussian negative log likelihood (GNLL) loss:

$$\text{Loss} = \sum_{i=1}^{|L|} \lambda_i \left( \underbrace{\log(\sigma_i^2)}_{Loss_\sigma} + \underbrace{\frac{\|\mu_i - \mu_i'\|^2}{2\sigma_i^2}}_{Loss_\mu} \right) \quad (3)$$

Clause 5: The method of any of clauses 1-4, wherein a relative likelihood that a sample from the 2D random variable will equal the ground truth keypoint location is:

$$\frac{1}{2\pi\sigma^2} e^{-\frac{(x-x')^2 + (y-y')^2}{2\sigma^2}}$$

wherein the sample is at (x', y') and the ground truth is at (x, y).

Clause 6: The method of any of clauses 1-5, further comprising minimizing a loss that is a sum of negative log-likelihoods.

Clause 7: The method of clauses 1-6, wherein the ground truth consists of a set of keypoint coordinates $Y \in \mathbb{R}^{N \times 2}$:

$$Y = \begin{bmatrix} x_0 & y_0 \\ x_1 & y_1 \\ \vdots & \vdots \\ x_N & y_N \end{bmatrix}.$$

Clause 8: The method of any of clauses 1-7, further comprising predicting occluded keypoints and keypoints outside of the image.

Clause 9: The method of any of clauses 1-8, wherein the keypoints are predicted at a sub-pixel precision.

Clause 10: The method of any of clauses 1-9, wherein the image is received from a set of introspective sensors attached to a HMD, the method further comprising:
  performing 3D facial reconstruction from multiple views of the introspective sensors.

Clause 11: The method of any of clauses 1-10, further comprising localizing or calibrating the HMD or accessories thereof.

Clause 12: The method of any of clauses 1-11, wherein ground truth images and keypoints comprise pairs of images captured by a camera or sensor with annotated ground truth.

Clause 13: The method of any of clauses 1-12, wherein ground truth images and keypoints are generated or rendered by a computer.

Clause 14: The method of any of clauses 1-13 wherein training data for the neural network include keypoints that are occluded or outside of ground truth images.

Clause 15: A computing system for fitting a model using observation data, the computing system comprising:
  one or more processors; and
  a computer-readable storage medium having computer-executable instructions stored thereupon which, when executed by the processor, cause the computing system to perform operations comprising:
  executing a neural network configured to predict keypoints as a 2D random variable, normally distributed with location (x, y) and standard deviation sigma;
  training a network to maximize a log-likelihood that samples from each predicted keypoint equal a ground truth; and using the trained network to predict keypoints of an image.

Clause 16: The computing system of clause 15, wherein each of the keypoints is predicted as a random variable with probability density function of a circular 2D Gaussian $p(x, \sigma) = \mathcal{N}(x|\sigma)p(\sigma)$; $p(\sigma) = 1$.

Clause 17: The computing system of any of clauses 15 and 16, wherein a relative likelihood that a sample from the 2D random variable will equal the ground truth keypoint location is:

$$\frac{1}{2\pi\sigma^2} e^{-\frac{(x-x')^2 + (y-y')^2}{2\sigma^2}}$$

wherein the sample is at (x', y') and the ground truth is at (x, y).

Clause 18: The computing system of any clauses 15-17, further comprising computer-executable instructions stored thereupon which, when executed by the processor, cause the computing system to perform operations comprising minimizing a loss that is a sum of negative log-likelihoods.

Clause 19: The computing system of any clauses 15-18, wherein the ground truth consists of a set of keypoint coordinates $Y \in \mathbb{R}^{N \times 2}$:

$$Y = \begin{bmatrix} x_0 & y_0 \\ x_1 & y_1 \\ \vdots & \vdots \\ x_N & y_N \end{bmatrix}.$$

Clause 20: A computer-readable storage medium having computer-executable instructions stored thereupon which, when executed by a processor of a computing system, cause the computing system to perform operations comprising:
  executing a neural network configured to predict generating predictions for keypoints as a 2D random variable, normally distributed with location (x, y) and standard deviation sigma;
  training a network to maximize a log-likelihood that samples from each predicted keypoint equal a ground truth; and
  using the trained network to predict keypoints of an image.

The disclosure presented herein encompasses the subject matter set forth in the following additional example clauses.

Clause 1: A method for predicting keypoints by a computing system, the method comprising:
  generating, by the computing system, predictions for each of the keypoints of an image as a 2D random variable, normally distributed with location (x, y) and standard deviation sigma;
  training, by the computing system, a neural network to maximize a log-likelihood that samples from each of the predicted keypoints equal a ground truth; and
  using the trained neural network to predict keypoints of an image without generating a heatmap.

Clause 2: The method of clause 1, further comprising fitting a parametric model to the predicted keypoints.

Clause 3: The method of any of clauses 1-2, wherein distribution of uncertainty values is influenced during the training by introducing a suitable prior.

Clause 4: The method of any of clauses 1-3, wherein the image is of an object for which an a-priori model is available, the method further comprising preprocessing the image by:
  running a sliding window over the image;
  measuring average keypoint confidence for each window of the sliding window;
  if a window with a high average keypoint certainty is not found, determining that the object is not in the image; and
  otherwise, taking the window which reported a highest average keypoint confidence to contain the object.

Clause 5: The method of any of clauses 1-4, wherein the image is input from one or more of regular color (RGB) cameras, depth cameras, IR sensors, head-mounted cameras, event cameras, or web cameras.

Clause 6: The method of any of clauses 1-5, wherein the method is performed in combination with a model fitter that predicts intrinsic camera parameters.

Clause 7: The method of clauses 1-6, wherein the model fitter is configured for a single view where uncertainty of each landmark is taken into account.

Clause 8: The method of any of clauses 1-7, wherein the model fitter is configured for multiple views.

Clause 9: The method of any of clauses 1-8, wherein an energy function for fitting the parametric model comprises $$E(\Phi; L) = \underbrace{E_{landmarks}}_{\text{Data term}} + \underbrace{E_{identity} + E_{expression} + E_{joints} + E_{temporal} + E_{intersect}}_{\text{Regularizers}}.$$

Clause 10: A computing system for fitting a model using observation data, the computing system comprising:
  one or more processors; and
  a computer-readable storage medium having computer-executable instructions stored thereupon which, when executed by the processor, cause the computing system to perform operations comprising:
    generating predictions for keypoints as a 2D random variable, normally distributed with location (x, y) and standard deviation sigma;
    training a neural network to maximize a log-likelihood that samples from each predicted keypoint equal a ground truth;
    using the trained neural network to predict keypoints of an image; and
    fitting a parametric model to the predicted keypoints.

Clause 11: The computing system of clause 10, wherein distribution of uncertainty values is influenced during the training by introducing a suitable prior.

Clause 12: The computing system of any of clauses 10 and 11, wherein the image is of an object, further comprising computer-executable instructions stored thereupon which, when executed by the processor, cause the computing system to perform operations for preprocessing the image, comprising:
  running a sliding window over the image;
  measuring average keypoint confidence for each window;
  if a window with a high average keypoint certainty is not found, determining that the object is not in the image; and
  otherwise, taking the window which reported the highest average keypoint confidence to contain the object.

Clause 13: The computing system of any clauses 10-12, wherein the predicting and training is performed in combination with a model fitter that predicts intrinsic camera parameters.

Clause 14: The computing system of any clauses 10-13, wherein the model fitter is configured for a single view where uncertainty of each landmark is taken into account.

Clause 15: The computing system of any clauses 10-14, further comprising computer-executable instructions stored thereupon which, when executed by the processor, cause the computing system to perform operations comprising performing 3D reconstruction from multiple views from multiple cameras, where an uncertainty in each view is taken into account, and wherein extrinsic parameters of each camera are concurrently optimized.

Clause 16: The computing system of any clauses 10-15, wherein the cameras are HMD cameras.

Clause 17: The computing system of any clauses 10-16, computer-executable instructions stored thereupon which, when executed by the processor, cause the computing system to perform operations comprising using uncertainties of the neural network to estimate which parts of an object being tracked are visible.

Clause 18: A method for predicting parameters of a 3D model that corresponds to image data using a convolutional neural network (CNN) running on a computing system, the method comprising:
  predicting probabilistic dense 2D landmarks L using the convolutional neural network (CNN);
  fitting a 3D model, parameterized by model parameters $\Phi$ to the 2D landmarks L by minimizing an energy function $E(\Phi; L)$; and
  outputting the fitted 3D model.

Clause 19: The method of clause 18, wherein a model of an object is fitted to 2D probabilistic keypoint estimates from multiple cameras.

Clause 20: The method of any of clauses 18 or 19, further comprising fitting a 3D model over a temporal sequence.

What is claimed is:

1. A method for predicting keypoints by a computing system, the method comprising:
  receiving, by the computing system, data indicative of a plurality of images;
  generating, by the computing system, predictions for keypoints of the plurality of images as 2D random variables, normally distributed with location (x, y) and standard deviation sigma;
  training, by the computing system, a neural network to maximize a log-likelihood that samples from each of the predicted keypoints equal a ground truth by minimizing a sum of Gaussian negative log likelihoods; wherein the training comprises introducing a conjugate prior of a Gaussian distribution of uncertainty values for the predicted keypoints;
  using the trained neural network to predict keypoints of a 3D image without generating a heatmap; and
  based on the predicted keypoints of the 3D image, outputting a fitted 3D model for rendering on a display device.

2. The method of claim 1, further comprising fitting a parametric model to the predicted keypoints.

3. The method of claim 2, wherein an energy function for fitting the parametric model comprises $$E(\Phi; L) = \underbrace{E_{landmarks}}_{\text{Data term}} + \underbrace{E_{identity} + E_{expression} + E_{joints} + E_{temporal} + E_{intersect}}_{\text{Regularizers}}$$

wherein E(Φ; L) comprises the energy function, $E_{landmarks}$ is a data term and remaining terms use prior knowledge to regularize the fit of the parametric model.

4. The method of claim 1, wherein distribution of uncertainty values is influenced during the training by introducing a suitable prior.

5. The method of claim 1, wherein the image is of an object for which an a-priori model is available, the method further comprising preprocessing the image by:
  running a sliding window over the image;
  measuring average keypoint confidence for each window of the sliding window;
  if a window with a high average keypoint certainty is not found, determining that the object is not in the image; and
  otherwise, taking the window which reported a highest average keypoint confidence to contain the object.

6. The method of claim 1, wherein the image is input from one or more of regular color (RGB) cameras, depth cameras, IR sensors, head-mounted cameras, event cameras, or web cameras.

7. The method of claim 1, wherein the method is performed in combination with a model fitter that predicts intrinsic camera parameters.

8. The method of claim 7, wherein the model fitter is configured for a single view where uncertainty of each landmark is taken into account.

9. The method of claim 7, wherein the model fitter is configured for multiple views.

10. A computing system for fitting a model using observation data, the computing system comprising:
  one or more processors; and
  a computer-readable storage medium having computer-executable instructions stored thereupon which, when executed by the processor, cause the computing system to perform operations comprising:
  receiving, by the computing system, data indicative of a plurality of images;
  generating predictions for keypoints of the plurality of images as 2D random variables, normally distributed with location (x, y) and standard deviation sigma;
  training a neural network to maximize a log-likelihood that samples from each predicted keypoint equal a ground truth by minimizing a sum of Gaussian negative log likelihoods; wherein the training comprises introducing a conjugate prior of a Gaussian distribution of uncertainty values for the predicted keypoints;
  using the trained neural network to predict keypoints of a 3D image;
  fitting a parametric model to the predicted keypoints; and
  based on the predicted keypoints of the 3D image, outputting a fitted 3D model for rendering on a display device.

11. The computing system of claim 10, wherein distribution of uncertainty values is influenced during the training by introducing a suitable prior.

12. The computing system of claim 10, wherein the image is of an object, further comprising computer-executable instructions stored thereupon which, when executed by the processor, cause the computing system to perform operations for preprocessing the image, comprising:
  running a sliding window over the image;
  measuring average keypoint confidence for each window;
  if a window with a high average keypoint certainty is not found, determining that the object is not in the image; and
  otherwise, taking the window which reported the highest average keypoint confidence to contain the object.

13. The computing system of claim 10, wherein the predicting and training is performed in combination with a model fitter that predicts intrinsic camera parameters.

14. The computing system of claim 13, wherein the model fitter is configured for a single view where uncertainty of each landmark is taken into account.

15. The computing system of claim 10, further comprising computer-executable instructions stored thereupon which, when executed by the processor, cause the computing system to perform operations comprising performing 3D reconstruction from multiple views from multiple cameras, where an uncertainty in each view is taken into account, and wherein extrinsic parameters of each camera are concurrently optimized.

16. The computer system of claim 15, wherein the cameras are HMD cameras.

17. The computing system of claim 10, computer-executable instructions stored thereupon which, when executed by the processor, cause the computing system to perform operations comprising using uncertainties of the neural network to estimate which parts of an object being tracked are visible.

18. A non-transitory computer-readable storage medium having computer-executable instructions stored thereupon which, when executed by a processor of a computing device, cause the computing device to perform operations comprising:
  receiving data indicative of a plurality of images;
  generating predictions for keypoints of the plurality of images as 2D random variables, normally distributed with location (x, y) and standard deviation sigma;

training a neural network to maximize a log-likelihood that samples from each predicted keypoint equal a ground truth by minimizing a sum of Gaussian negative log likelihoods; wherein the training comprises introducing a conjugate prior of a Gaussian distribution of uncertainty values for the predicted keypoints;

using the trained neural network to predict keypoints of a 3D image;

fitting a parametric model to the predicted keypoints; and based on the predicted keypoints of the 3D image, outputting a fitted 3D model for rendering on a display device.

19. The non-transitory computer-readable storage medium of claim 18, wherein the image is of an object for which an a-priori model is available, further comprising preprocessing the image by:

running a sliding window over the image;

measuring average keypoint confidence for each window of the sliding window;

if a window with a high average keypoint certainty is not found, determining that the object is not in the image; and otherwise, taking the window which reported a highest average keypoint confidence to contain the object.

20. The non-transitory computer-readable storage medium of claim 18, wherein the predicting and training is performed in combination with a model fitter that predicts intrinsic camera parameters.

* * * * *